United States Patent [19]

Chea, Jr.

[11] 4,317,963

[45] Mar. 2, 1982

[54] SUBSCRIBER LINE INTERFACE CIRCUIT UTILIZING IMPEDANCE SYNTHESIZER AND SHARED VOLTAGE SOURCE FOR LOOP CURRENT REGULATION CONTROL

[75] Inventor: Ramon C. W. Chea, Jr., Monroe, Conn.

[73] Assignee: International Telephone and Telegraph Corporation, New York, N.Y.

[21] Appl. No.: 189,976

[22] Filed: Sep. 22, 1980

[51] Int. Cl.³ .......................................... H04M 19/00
[52] U.S. Cl. ................................. 179/77; 179/18 FA
[58] Field of Search .............. 179/18 F, 18 FA, 16 R, 179/16 A, 16 AA, 16 E, 16 F, 70, 77, 81 R, 84 R

[56] References Cited

FOREIGN PATENT DOCUMENTS 2551916  7/1981  Fed. Rep. of Germany .

*Primary Examiner*—Thomas A. Robinson
*Attorney, Agent, or Firm*—John T. O'Halloran; Jeffrey P. Morris

[57] ABSTRACT

A subscriber line interface circuit is described wherein current supplied to a telephone subscriber line from a shared voltage source such as a DC/DC converter is regulated thereby permitting a regulated line current to be supplied to a plurality of line circuits from a single shared voltage source. In accordance with the present invention, both the dc line feed and the ac transmission requirements of a subscriber line interface circuit for a telephone exchange are implemented in a single circuit incorporating ac and dc impedance synthesis techniques. A significant reduction in the heretofore required expensive and bulky discrete components of the subscriber line interface circuit is achieved.

17 Claims, 9 Drawing Figures

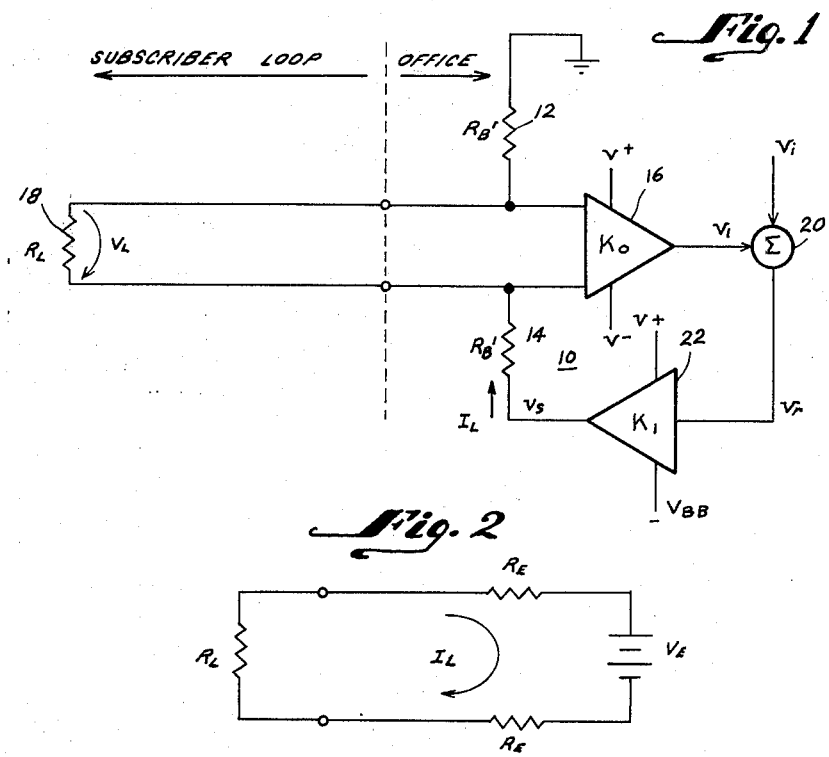
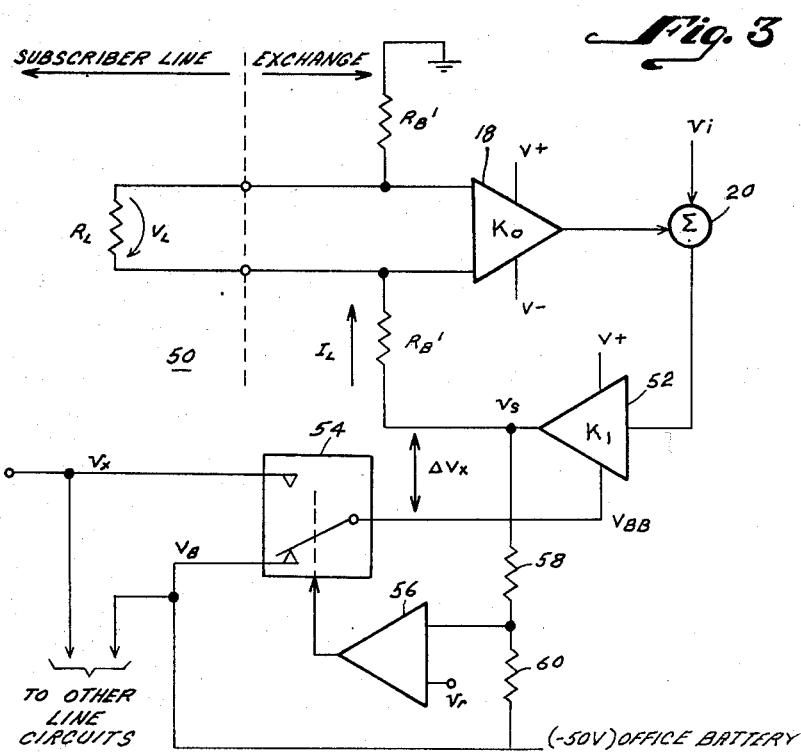

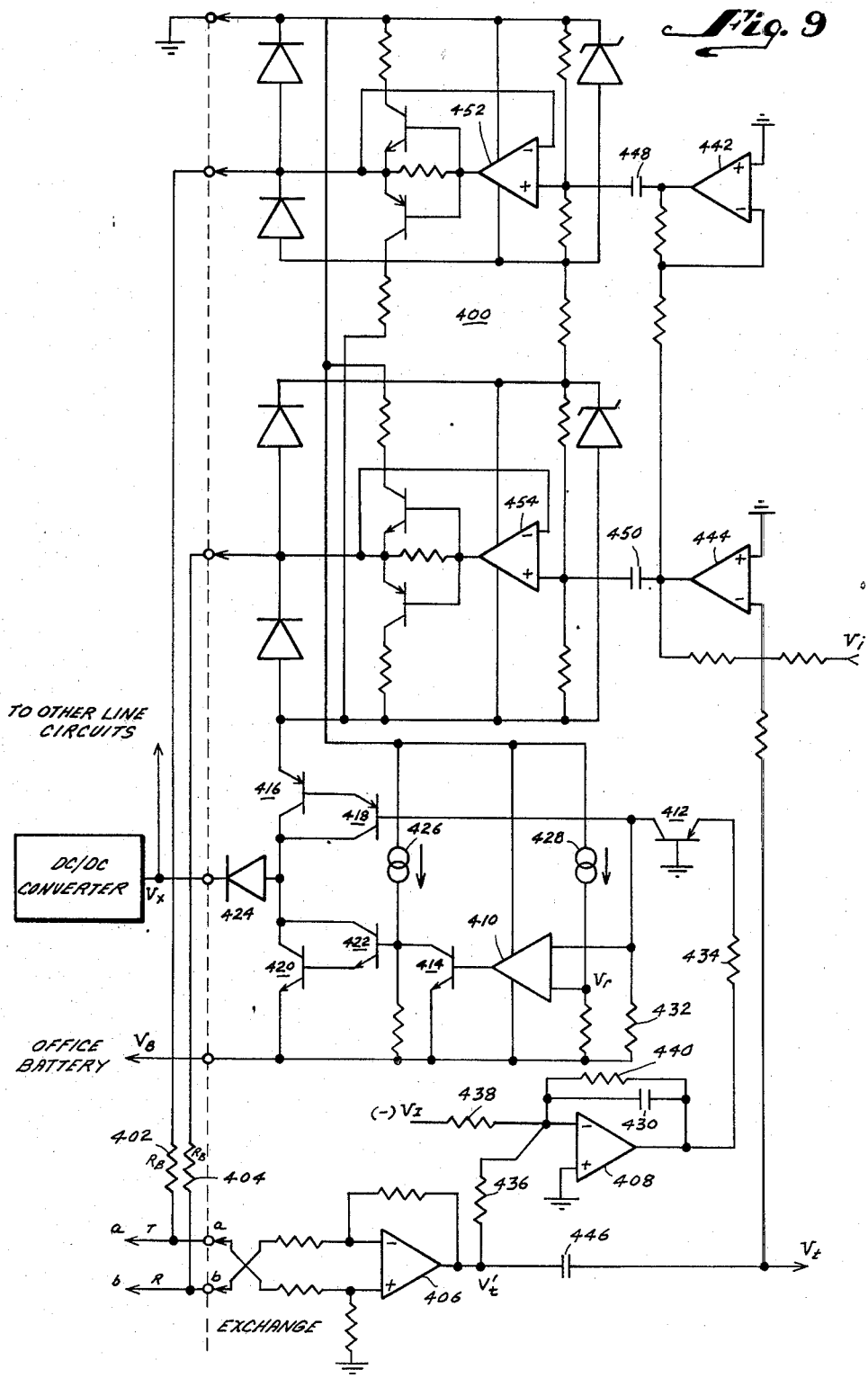

4,317,963

SUBSCRIBER LINE INTERFACE CIRCUIT UTILIZING IMPEDANCE SYNTHESIZER AND SHARED VOLTAGE SOURCE FOR LOOP CURRENT REGULATION CONTROL

BACKGROUND OF THE INVENTION

1. Field of the Invention

The present invention relates generally to the provision of regulated current to one or more telephone subscriber loops from a telephone central office and more particularly to a subscriber line interface circuit for supplying such regulated loop current while at the same time reducing power dissipation in the subscriber line interface circuit.

2. Description of the Prior Art

Various telephone subscriber line interface circuit techniques are known in the prior art for controlling the telephone subscriber loop dc current. Copending application, Ser. No. 98,104, filed Nov. 28, 1979, describes a generalized impedance synthesis technique wherein dc loop feed characteristics are synthesized in accordance with a subscriber loop connected to a telephone exchange. In copending U.S. Application, Ser. No. 180,751, filed Aug. 25, 1980, a generalized impedance synthesis technique is described wherein by using either voltage or current feedback methods, the ac transmission termination impedance characteristics of a subscriber line interface circuit are synthesized. Descriptions of the known prior art are included within said copending applications, which are assigned to the same assignee as is the present application and reference may be made thereto for such description of the prior art. In accordance with the present invention, improved circuit embodiments are described wherein both the dc and ac current provided to a telephone subscriber loop are regulated by a single circuit configuration having reduced power dissipation.

SUMMARY OF THE INVENTION

A subscriber line interface circuit is described wherein current supplied to a telephone subscriber line from a shared voltage source such as a DC/DC converter is regulated thereby permitting a regulated line current to be supplied to a plurality of line circuits from a single shared voltage source. In accordance with the present invention, both the dc line feed and the ac transmission requirements of a subscriber line interface circuit for a telephone exchange are implemented in a single circuit incorporating an impedance synthesis technique. A significant reduction in the heretofore required expensive and bulky discrete components of the subscriber line interface circuit is achieved.

BRIEF DESCRIPTION OF THE DRAWINGS

FIG. 1 is a simplified block diagram of a subscriber line interface circuit (SLIC) incorporating a voltage feedback technique.

FIG. 2 is the corresponding equivalent circuit in terms of loop current of FIG. 1.

FIG. 3 is a more detailed block diagram of the voltage feedback technique described in connection with FIG. 1.

FIG. 9 is an embodiment of the SLIC of the present invention including a voltage feedback impedance synthesis technique.

DESCRIPTION OF THE PREFERRED EMBODIMENTS

Figure 4:
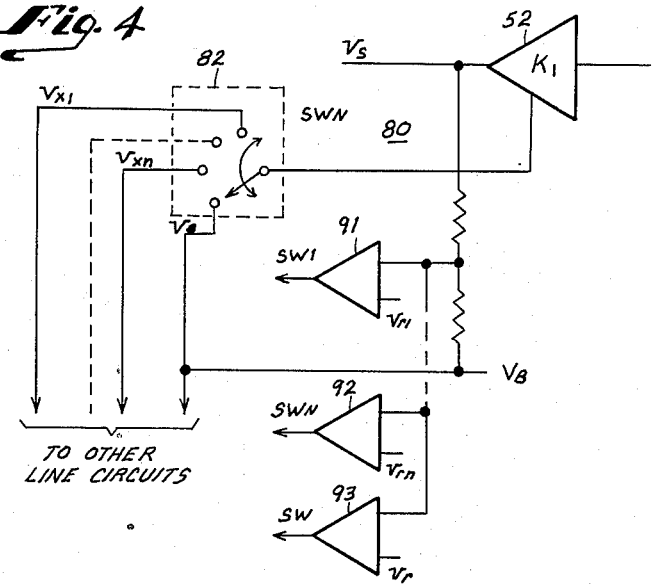
FIG. 4 is a variation of the SLIC of FIG. 3 illustrative of the switching of a bias voltage to a plurality of values.

Referring now to FIG. 1, a block diagram of a voltage feedback line circuit having impedance synthesis is illustrated generally at 10. Line feed resistors 12 and 14 are coupled to the inputs of a high input impedance differential amplifier 16 which senses the voltage across the loop illustrated at $R_L$ by numeral 18. The output of amplifier 16 is coupled to a summation circuit 20 together with an input voltage $v_i$ and a composite output voltage $v_r$ is derived which is coupled to the input of a power amplifier 22. Amplifier 16 is preferably a signal processing amplifier which can comprise a conventional operational amplifier biased from a positive and negative voltage supply. Similarly, summation circuit 20 may comprise a plurality of operational amplifiers. Power amplifier 22 is biased from a positive voltage supply which may be at a ground potential such as the battery ground of a telephone exchange. The negative voltage input to power amplifier 22, $V_{BB}$, may consist of a standard power supply or may comprise the telephone exchange battery or could comprise a DC/DC converter. The loop current provided by the circuit of FIG. 1 is represented as follows:

$$I_L = \left(\frac{k_1 v_i}{1 - k_o k_1}\right)\left(\frac{1}{R_L + \frac{2R_B'}{(1 - k_2 k_1)}}\right) \quad \text{(Eq. 1)}$$

The equivalent voltage $V_E$ of the loop illustrated by the equivalent circuit of FIG. 2 is represented as follows:

$$V_E = \frac{k_1 v_i}{1 - k_o k_1} \quad \text{(Eq. 2)}$$

The equivalent resistance $R_E$ of the loop illustrated by the equivalent circuit of FIG. 2 is represented as follows:

$$R_E = \frac{R_B'}{1 - k_o k_1} \quad \text{(Eq. 3)}$$

If amplifier 22 consisted of a standard amplifier biased from a fixed voltage source such as the $-50$ volt exchange battery, the overhead bias power for amplifier 22 would become prohibitively high under normal operating conditions of the subscriber loop since the output voltage $v_s$ of amplifier 22 varies in accordance with the network parameters and hence a significant voltage differential could be present between the output of amplifier 22, $v_s$, and $V_{BB}$. This overhead bias power dissipation is eliminated by a proper bias voltage arrangement for $V_{BB}$ in accordance with a feature of the present invention.

Referring now to FIG. 3, a preferred embodiment of the invention is illustrated generally at 50 incorporating a voltage feedback arrangement. In accordance with the circuit of FIG. 3, $V_{BB}$, the negative bias voltage for amplifier 52 is derived either from $V_B$, the central or local office battery voltage, or from $v_x$, the output voltage from another power supply (not shown) having a voltage magnitude less than the magnitude of $V_B$. A switch 54 serves to couple $V_{BB}$ to either $V_B$ or $V_x$. The switch 54 operation is controlled by the output of comparator 56. Comparator 56 has two inputs coupled thereto, one of which inputs being connected to a voltage divider comprised of resistors 58 and 60 which senses the output voltage $v_s$ of amplifier 52, and the other of which inputs being connected to a reference voltage $v_r$, which may be derived via a resistive divider network. Such resistive divider network could, for example, be interposed between battery voltage $V_B$ and ground so that when the magnitude of voltage $v_s$ exceeds the magnitude of voltage $v_x$, the output of comparator 56 changes state to cause switch 54 to operate, thereby connecting $V_{BB}$ to $v_x$. The switching of bias voltage $V_{BB}$ from $V_B$ to $v_x$ reduces overhead bias power dissipation on amplifier 52. The operation of summation circuit 20 and amplifier 18 is identical to the same numbered elements of FIG. 1.

Referring now to FIG. 4, an arrangement is illustrated generally at 80 for switching the bias voltage supplied to amplifier 52 between more than two values via switch 82. A plurality of voltages $v_x$ and $V_B$, the office battery, may be common to or shared by a plurality of line circuits as illustrated. Switch 82 couples $v_x$, thru $v_{xn}$ and $V_B$ to other line circuits. Voltage source $v_x$ can be switched via a single printed circuit board while the battery voltage $V_B$ can be common to all line circuits in a telephone exchange. The details of voltage supply $v_x$ are not described in detail herein, however, the $v_x$ supply can comprise a DC/DC converter of the type described in aforementioned copending U.S. application, Ser. No. 098,104 and to which reference is directed. The output of amplifiers 91, 92, and 93 is coupled to the control inputs of a plurality of switches, one of which, switch 82, is illustrated.

Figure 5:
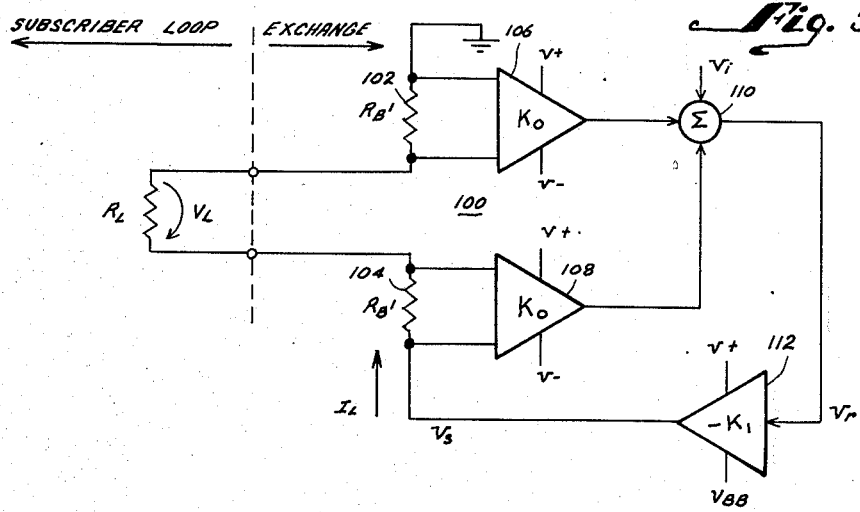
FIG. 5 is a simplified block diagram of a line circuit in accordance with the present invention.
Figure 6:
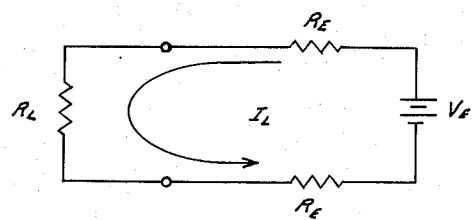
FIG. 6 is the corresponding equivalent circuit in terms of loop current of the line circuit of FIG. 5.

Referring now to FIGS. 5 and 6 a circuit configuration of a current feedback network topology is illustrated generally at 100 and the corresponding equivalent circuit in terms of the loop current $I_L$ is shown at FIG. 6. Line circuit 100 includes a pair of line feed resistors $R_B'$, 102 and 104, which feed loop current $I_L$ into a subscriber loop having a resistance represented by $R_L$. Loop current $I_L$ is sensed by a pair of high input impedance differential amplifiers 106 and 108 which sense the loop current $I_L$ from the voltage drop across line feed resistors 102 and 104, respectively. A summation circuit 110 has coupled thereto the output of differential amplifiers 106 and 108 and $v_i$ and has an output voltage $v_r$ which is coupled to power amplifier 112. Amplifiers 106 and 108 may comprise signal processing amplifiers which are configured from conventional operational amplifiers biased from a positive and a negative power supply. Similarly, summation circuit 110 can also be comprised from standard operational amplifiers. Amplifier 112 is required to handle the power and voltage requirements of the line feed function and is biased from a positive supply which may be at ground potential which would be the case of the battery ground of a telephone exchange. A negative voltage supply $V_{BB}$ which biases amplifier 112 may comprise a standard power supply or the telephone exchange battery or could comprise a DC/DC converter. The use of a DC/DC converter sets voltages $v_s$ and $V_{BB}$ at the same potential and eliminates overhead-bias power dissipation for amplifier 112 resulting in a power efficient device. The disadvantage of the DC/DC converter is that it requires bulky discrete components for each line circuit including a power pulse transformer, high current switching transistor and large capacitors. Additionally, such DC/DC converter can generate high frequency noise. Alternatively, each amplifier 112 may comprise a standard amplifier biased from a fixed voltage source such as the exchange battery ($-50$ volts). The overhead bias power for amplifier 112 becomes prohibitively high under certain operating conditions of the subscriber loop because the output voltage $v_s$ of amplifier 112 varies in accordance with the network parameters and hence a large voltage differential could exist between $v_x$ and $V_{BB}$ thereby producing undesirable high power dissipation. In accordance with the present invention, a novel bias voltage arrangement is provided for voltage $V_{BB}$ such that the overhead bias power dissipation is minimized.

With reference to the equivalent circuit of FIG. 6, it can be seen that the equivalent loop resistance $R_E$:

$$RE = R_B'(1 + 2k_0 k_1) \qquad \text{(Eq. 4)}$$

The equivalent voltage is:

$$V_E = -2k_1 v_i \qquad \text{(Eq. 5)}$$

The loop current is then expressed as follows:

$$I_L = \frac{-2k_1 v_i}{R_L + 2R_B'(1 + 2k_0 k_1)} \qquad \text{(Eq. 6)}$$

Figure 7:
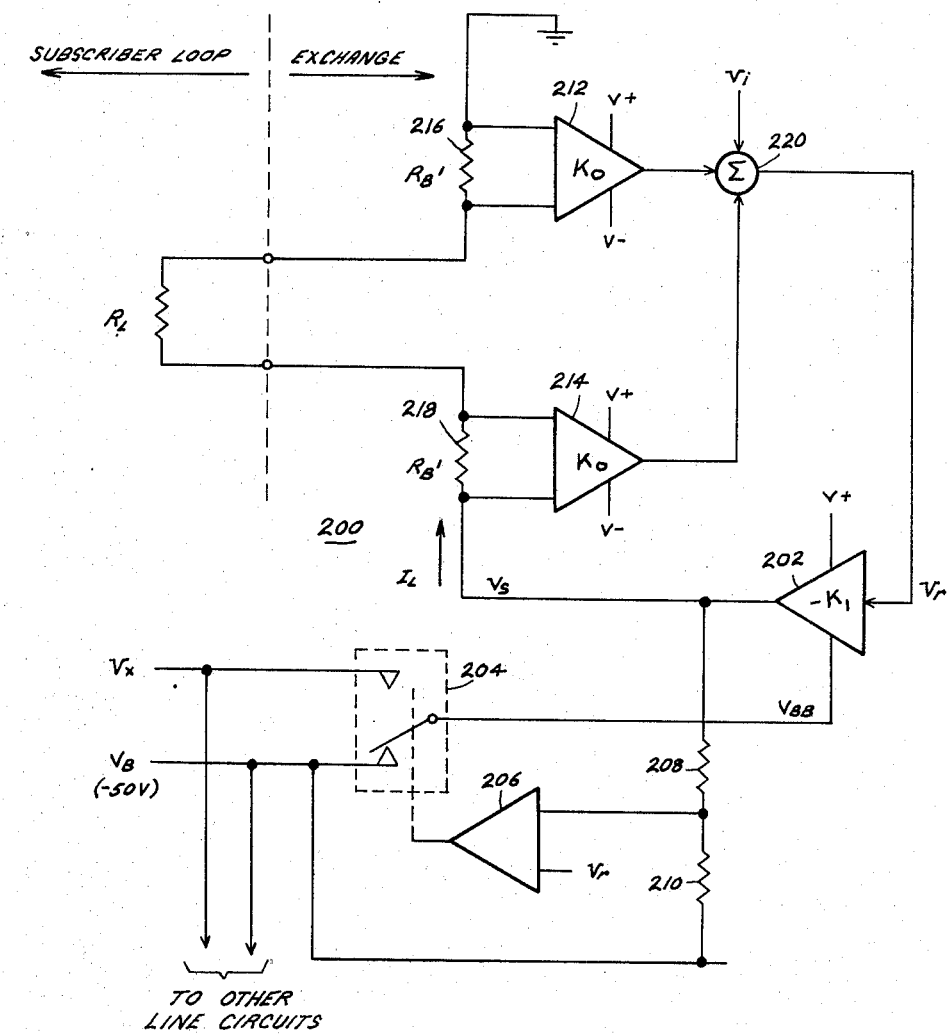
FIG. 7 is a simplified block diagram of an embodiment of the present invention using current feedback.

Referring now to FIG. 7, an embodiment of the present invention employing current feedback is illustrated generally at 200. Line circuit 200 is essentially similar to line circuit 100 of FIG. 5 except that negative bias $V_{BB}$ for amplifier 112 of FIG. 5, shown as amplifier 202 of FIG. 7, is connected to either the office battery $V_B$ or to another power supply $v_x$, the voltage magnitude of which is chosen to be less than voltage $V_B$. The selection is made by switch 204. The operation of switch 204 is controlled by the output of a comparator 206 having one input thereof connected to a voltage divider formed from resistors 208 and 210 and which functions to sense the output voltage $v_s$ of amplifier 202. The other input of comparator 206 is connected to a reference voltage $v_r$ which may be derived through a resistive divider network from battery $V_B$ to ground such that when $v_s$ is greater than $v_x$, the output of comparator 206 changes state to operate switch 204 and thereby connects the $V_{BB}$ line to voltage $v_x$. The switching of the bias voltage $V_{BB}$ from $V_B$ to $v_x$ reduces overhead bias power dissipation for amplifier 206. It is readily apparent that the concept of switching the bias voltage between more than two values can be readily achieved, as is illustrated with reference to FIG. 4 by comparators 91, 92, and 93 coupled to switches $S_{wi}$, $S_{wn}$, and $S_w$. Voltages $v_x$ and battery voltage $V_B$ are either common to or shared by more than one line circuit. High input impedance differential amplifiers 212 and 214 across feed resistances 216 and 218 function in equivalent manner as do like circuit elements described with reference to FIG. 5.

Figure 8:
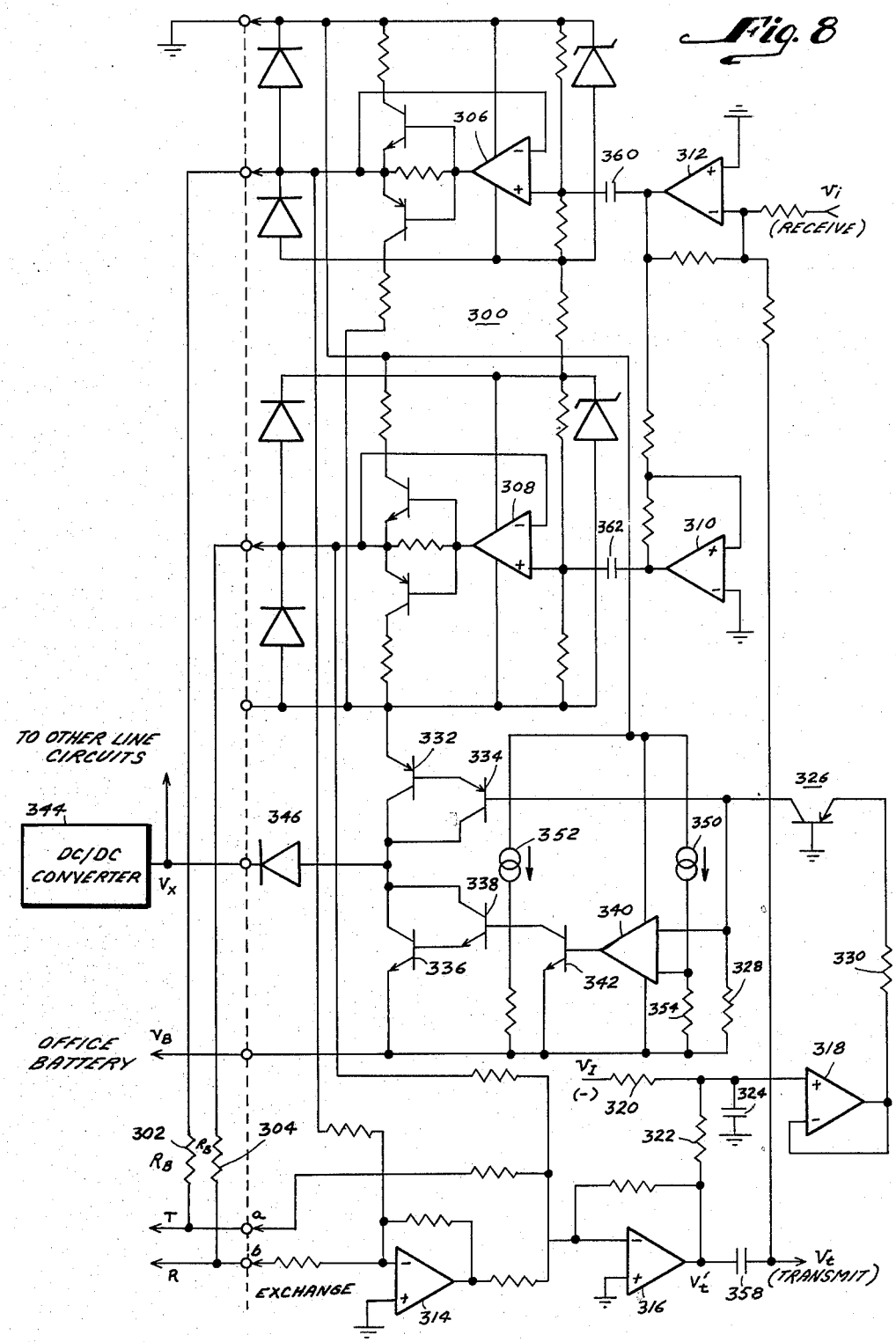
FIG. 8 is a detailed schematic of an embodiment of the SLIC of the present invention using current feedback impedance synthesis techniques.

Referring now to FIG. 8, a detailed circuit diagram which utilizes a current feedback impedance synthesis technique to synthesize both the ac and dc impedance and the required voltages of the SLIC, as seen at the (a) and (b) leads looking into the exchange is shown generally at 300. Both the dc equivalent feed resistance and the ac equivalent transmission termination impedance are determined by the feed resistors $R_B$ at 302 and 304 and the corresponding feedback parameters.

Amplifiers 306 and 308 and their surrounding components comprise a pair of buffer amplifiers capable of handling the dc and ac electrical requirements of the SLIC function. Amplifiers 310 and 312 and their surrounding components comprise a differential balanced-driver pair. In addition, amplifier 312 also functions as a summing amplifier, which adds the receive ($v_i$) and the feedback signal ($v_t$). Amplifiers 314 and 316 and their surrounding components comprise a balance-current-sense buffer amplifier. Amplifier 318 is a summing-point/buffer, with the summing operation performed by resistors 320 and 322 which are connected to the positive input of amplifier 318. Capacitor 324 serves to filter out undesired ac signals. Transistor 326 and associated resistors 328 and 330 comprise a level-shifter/amplifier. Transistors 332 and 334 comprise a follower/power amplifier which functions to handle the power requirement of the line feed function. Transistors 336 and 338 comprise a high current switch which functions to handle the maximum line feed current while maintaining low saturation voltage in the transistor ON-state. Comparator 340, transistor 342 and the surrounding components comprise a decision making/switch-driver device. Voltage source 344 is a circuit that is common to more than one line circuit and which has a voltage magnitude chosen to be less than the battery voltage. Voltage source 344 may comprise a DC/DC converter.

For dc resistance synthesis, a feedback network is comprised by the current-sense/buffer amplifier comprised of amplifiers 314 and 316, resistors 320, 322, capacitor 324 and buffer 318, resistors 328, 330, and transistor 326, comparator 340, transistors 342, 332, 334, 338, and 336, diode 346, and voltage source 344. The aforementioned circuit elements correspond to the functional block diagram of FIG. 7 as follows: Amplifiers 212 and 214 of FIG. 7 correspond to amplifiers 314 and 316 and their surrounding components of FIG. 8. Summing point circuit 220 of FIG. 7 is implemented by resistors 320, 322, capacitor 324, and buffer 318 of FIG. 8. Amplifier 202 is implemented by transistors 326, 332, and 334 and by resistors 328 and 330, all of FIG. 8. Comparator 206 of FIG. 7 is implemented by comparator 340, transistor 342, and current source 350 of FIG. 8. Switch 204 in FIG. 7 is implemented by transistors 338 and 336, current source 352, and diode 346 of FIG. 8. Feed resistors 302 and 304 of FIG. 8 correspond to feed resistors 216 and 218 of FIG. 7.

The operation of the dc resistance synthesis loop of FIG. 8 is now described. Buffer amplifier 314 and 316 senses current in the feed resistors 302 and 304 and produces a transmit voltage $v_t'$ at its output. This voltage is fed to a summing node at the positive input of amplifier 318 via resistor 322. Similarly, $V_I$ is fed to the same summing point via resistor 320. Capacitor 324 filters out all ac signals. The output of amplifier 318 is fed into the level-shift amplifier comprised of transistor 326 and resistors 328 and 330. The ratio of resistors 328 and 330 determines the gain of this amplifier. Transistors 332 and 334 function as a buffer/voltage-follower with the output at the emitter of transistor 332. This output is $v_S$ as shown in FIG. 7, which feeds the buffer amplifiers 306 and 308. Current course 350 and resistor 354 define the switching threshold of the comparator 340. When the output of comparator 340 is low, transistor 342 turned ON, thereby steering the current from current source 352 away from the base of transistor 338, and thereby turning OFF transistors 338 and 336. This mechanism connects the collectors of transistors 332 and 334 via forward bias diode 346 to $v_x$ (the DC/DC converter output). Diode 346 is back-biased when transistors 338 and 336 are OFF because $v_x$ is chosen to be at a higher voltage potential than $V_B$. The action of connecting the collectors of transistors 332 and 334 to $v_x$ reduces the voltage drop across these transistors and thereby reduces power dissipation. The switching threshold is chosen to optimize system performance in terms of power.

For the ac impedance synthesis, the feedback network is comprised of the buffer-current sense amplifier 314 and 316, capacitor 358, amplifiers 310 and 312, capacitors 360, 362, and amplifiers 306 and 308, and their surrounding components. This circuit is described in greater detail in aforementioned copending application Ser. No. 180,751 and reference may be made thereto for such further details.

Referring now to FIG. 9, a circuit which utilizes a voltage feedback impedance synthesis technique to synthesize both the dc and ac impedance, and the required voltages of the SLIC, as seen at the (a) and (b) leads looking into the exchange is shown generally at 400. Both the dc equivalent feed resistance and the ac equivalent transmission termination impedance are determined by the feed resistors 402 and 404 and the corresponding feedback parameters.

The circuit of FIG. 9 is in similar configuration and operation of the circuit described with reference to FIG. 8, except that the current-sense/buffer amplifier 314 and 316 of FIG. 8 is replaced by a voltage-sense/buffer amplifier 406 as shown in FIG. 9.

For dc resistance synthesis, the feedback network is comprised of voltage-sense/buffer amplifier 406, amplifier 408, comparator 410, transistors 412, 414, 416, 418, 420, and 422, diode 424, current courses 426 and 428, capacitor 430, and surrounding resistors. The aforementioned elements correspond to the functional block diagram of FIG. 3 as follows. Amplifier 18 of FIG. 3 is implemented by amplifier 406 of FIG. 9. Summing point circuit 20 is implemented by amplifier 408. Amplifier 52 is implemented by transistors 412, 416, and 418 and resistors 432 and 434. Amplifier 56 is implemented by comparator 410 and transistor 414. Switch 54 is implemented by transistors 420 and 422, diode 424, and current source 426.

The operation of the circuit illustrated by FIG. 9 is now described. Amplifier 406 senses the voltage across the load, which consists of the subscriber loop shown at leads (a) and (b). The output of amplifier 402 is fed into the summing amplifier 408 via resistor 436. The voltage $V_I$, which defines the open circuit voltage across the subscriber loop (a) and (b) leads (sometimes referred to as the tip and ring lines) is also fed to the summing amplifier 408 via resistor 438. Resistor 440 and capacitor 430 together comprise a low pass filter which essentially filters out all ac signals. The output of amplifier 408 is fed to the level-shifter/amplifier, which is comprised of transistor 412 and resistors 432 and 434. The remaining elements of the dc feedback network perform in the same manner as described with reference to FIG. 8 for the current feedback embodiment.

For the ac impedance synthesis, described in more detail in the aforementioned application Ser. No. 180,751, the feedback network is comprised of voltage-sense/buffer amplifier 406, amplifiers 442 and 444, capacitors 446, 448, and 450; and amplifiers 452 and 454 and their surrounding components.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A line circuit for supplying regulated line current to one or more telephone subscriber lines comprising:
   a source of dc battery voltage;
   dc power supply means having a plurality of selectable output voltages having magnitudes less than the magnitude of said battery voltage;
   line feed impedance means;
   driver amplifier means for supplying regulated current to said subscriber line thru said line feed impedance means and having a bias voltage input coupled thereto;
   sensing means for sensing the output voltage of said driver amplifier means;
   switching means for selecting either said battery voltage or one of said selectable output voltages in response to a control input thereto and for coupling said selected voltage to said bias voltage input of said driver amplifier;
   comparator means for deriving said control input to said switching means in response to the comparison of the output of said sensing means to a reference voltage such that the overhead bias power dissipation of said amplifier is minimized by minimizing the differential between the bias voltage applied to said amplifier and the selected voltage.

2. A line circuit in accordance with claim 1 wherein said sensing means comprises a resistive divider network between said battery voltage and ground.

3. A line circuit in accordance with claim 1 wherein said dc power supply includes a dc-to-dc converter.

4. A line circuit in accordance with claim 1 further comprising:
   a plurality of said switching means for coupling said plurality of voltages to a plurality of line circuits such that said coupled voltages are shared by said plurality of line circuits; and
   means associated with said switching means for coupling said battery voltage to each of said line circuits.

5. A subscriber line circuit in accordance with claim 4 wherein said circuit is implementable upon one or more monolithic integrated circuit chips.

6. A subscriber line circuit for a subscriber loop for supplying regulated dc line feed current and a synthesized ac transmission termination impedance and synthesized dc feed resistance to reduce power dissipation in said circuit, comprising:
   means coupled to a source of line feed current;
   line feed impedance means;
   driver amplifier means for supplying line current to said subscriber loop thru said line feed impedance means;
   line current sensing means for sensing the line current from the voltage drop across said line feed impedance means, and having an output;
   summation circuit means for summing the output of said sensing means with an input voltage to derive a composite output feedback control signal coupled to said driver amplifier;
   means for regulating bias voltage applied to said driver amplifier such that the output voltage level of said driver amplifier and the bias voltage are maintained at substantially the same voltage level; and
   feedback control means responsive to transversal signals for controlling said feedback control signal such that the ac transverse termination impedance provided by said line circuit is synthesized from a lower resistance value.

7. A subscriber line circuit in accordance with claim 6 wherein said sensing means comprises a pair of high input impedance differential amplifiers.

8. A subscriber line circuit in accordance with claim 6 wherein said means for regulating said bias voltage includes:
   means for coupling battery voltage to said amplifier;
   means for deriving and selectively coupling to said amplifier a plurality of voltage levels lower than the voltage level of said battery voltage.

9. A subscriber line circuit in accordance with claim 8 wherein said means for deriving and selectively coupling includes:
   switching means for selecting a voltage level in response to a control signal and for coupling said selected voltage level to said amplifier as the bias voltage thereof.

10. A subscriber line circuit in accordance with claim 9 wherein said switching means includes means for selectively coupling said plurality of voltage levels to a plurality of subscriber line circuits whereby a shared voltage source is provided.

11. A subscriber line circuit in accordance with claim 9 further comprising:
   comparator means for deriving said control signal in response to the comparison of the output voltage of said driver amplifier and a reference voltage to minimize the bias power dissipation of said amplifier.

12. A subscriber line circuit in accordance with claim 9 wherein said regulating means includes a multilevel voltage source selectively coupled to said amplifier by said switching means.

13. A subscriber line circuit in accordance with claim 12 wherein said multilevel voltage source includes a dc-to-dc converter.

14. A subscriber line circuit in accordance with claim 6 wherein said circuit is implementable upon one or more monolithic integrated circuit chips.

15. A subscriber line circuit in accordance with claim 6 wherein said feedback control signal is a feedback voltage.

16. A subscriber line circuit in accordance with claim 6 wherein said feedback control signal is a feedback current.

17. A line circuit in accordance with claim 6 wherein said feedback control means is adapted to maintain the synthesized dc equivalent feed resistance and the synthesized ac equivalent transmission termination impedance determinable from the parameters of said line feed impedances and the parameters of said feedback control signals.

* * * * *